(12) United States Patent
Depalma et al.

(10) Patent No.: US 11,414,994 B2
(45) Date of Patent: Aug. 16, 2022

(54) BLADE RETENTION FEATURES FOR TURBOMACHINES

(71) Applicant: GE Avio S.r.l., Rivalta di Torino (IT)

(72) Inventors: Andrea Depalma, Rivalta di Torino (IT); Antonio Giuseppe D'Ettole, Rivoli (IT); Matteo Renato Usseglio, Turin (IT)

(73) Assignee: GE AVIO S.r.l., Rivalta di Torino (IT)

( * ) Notice: Subject to any disclaimer, the term of this patent is extended or adjusted under 35 U.S.C. 154(b) by 33 days.

(21) Appl. No.: 16/988,833

(22) Filed: Aug. 10, 2020

(65) Prior Publication Data
US 2021/0047930 A1 Feb. 18, 2021

(30) Foreign Application Priority Data

Aug. 13, 2019 (IT) ............... IT102019000014739

(51) Int. Cl.
*F01D 5/06* (2006.01)
*F02C 3/06* (2006.01)
(52) U.S. Cl.
CPC .............. *F01D 5/06* (2013.01); *F02C 3/06* (2013.01); *F05D 2220/40* (2013.01); *F05D 2240/24* (2013.01)
(58) Field of Classification Search
CPC .......... F01D 5/06; F01D 5/066; F01D 5/3007; F02C 3/06; F02C 3/067; F02K 3/072; F05D 2220/40; F05D 2240/24; F05D 2250/44; F05D 2260/30; Y02T 50/60
See application file for complete search history.

(56) References Cited

U.S. PATENT DOCUMENTS

| | | | |
|---|---|---|---|
| 3,339,833 A | 9/1967 | Bill et al. | |
| 3,362,681 A | 1/1968 | Smuland | |
| 4,451,205 A | 5/1984 | Honda et al. | |
| 4,623,298 A | 11/1986 | Hallinger et al. | |
| 4,730,983 A | 3/1988 | Naudet et al. | |
| 4,986,737 A | 1/1991 | Erdmann | |
| 5,191,711 A | 3/1993 | Vickers et al. | |
| 5,197,281 A | 3/1993 | Przytulski et al. | |
| 5,257,909 A | 11/1993 | Glynn et al. | |
| 5,288,210 A | 2/1994 | Albrecht et al. | |
| 5,307,622 A | 5/1994 | Ciokajlo et al. | |
| 6,139,263 A | 10/2000 | Klingels | |
| 6,732,502 B2* | 5/2004 | Seda ................... | F01D 5/03 60/226.1 |

(Continued)

FOREIGN PATENT DOCUMENTS

| | | |
|---|---|---|
| EP | 1340902 A2 | 9/2003 |
| EP | 1626002 A1 | 2/2006 |
| GB | 2206651 A | 1/1989 |

*Primary Examiner* — Jesse S Bogue
(74) *Attorney, Agent, or Firm* — McGarry Bair PC

(57) ABSTRACT

A turbomachine includes a rotatable annular outer drum rotor connected to a first plurality of blades. The rotatable annular outer drum rotor is constructed of, at least, a first drum segment and a second drum segment. The turbomachine further includes a retaining ring arranged and secured between the first and second drum segments of the rotatable annular outer drum rotor for radially retaining each of the first plurality of blades via their respective blade root portions within the rotatable annular outer drum rotor.

20 Claims, 7 Drawing Sheets

(56) References Cited

U.S. PATENT DOCUMENTS

| | | | |
|---|---|---|---|
| 6,763,654 B2* | 7/2004 | Orlando | F01D 1/24 |
| | | | 60/226.1 |
| 7,186,073 B2* | 3/2007 | Orlando | F01D 1/26 |
| | | | 29/889.21 |
| 7,334,392 B2 | 2/2008 | Moniz et al. | |
| 7,451,592 B2 | 11/2008 | Taylor et al. | |
| 7,494,323 B2 | 2/2009 | Douchkin et al. | |
| 7,513,102 B2 | 4/2009 | Moniz et al. | |
| 8,015,798 B2 | 9/2011 | Norris et al. | |
| 8,454,303 B2* | 6/2013 | Garcia-Crespo | F01D 9/042 |
| | | | 415/137 |
| 8,777,563 B2 | 7/2014 | Sarawate et al. | |
| 8,784,064 B2 | 7/2014 | Aschenbruck et al. | |
| 8,869,504 B1 | 10/2014 | Schwarz et al. | |
| 8,935,913 B2 | 1/2015 | Kupratis et al. | |
| 9,194,244 B2 | 11/2015 | Willett, Jr. | |
| 9,404,387 B2 | 8/2016 | Mitaritonna et al. | |
| 9,506,367 B2 | 11/2016 | Clouse | |
| 9,739,205 B2 | 8/2017 | Schwarz et al. | |
| 9,822,659 B2 | 11/2017 | Arikawa et al. | |
| 9,840,928 B2 | 12/2017 | Brummitt-Brown et al. | |
| 10,961,850 B2* | 3/2021 | van der Merwe | F01D 5/14 |
| 11,085,309 B2* | 8/2021 | Mondal | F01D 5/03 |
| 11,156,097 B2* | 10/2021 | Stuart | F01D 5/142 |
| 11,156,109 B2* | 10/2021 | Depalma | F01D 5/03 |
| 2004/0086377 A1* | 5/2004 | Proctor | F01D 1/26 |
| | | | 415/116 |
| 2006/0062673 A1 | 3/2006 | Coign et al. | |
| 2009/0041610 A1 | 2/2009 | Meier | |
| 2017/0211590 A1 | 7/2017 | Moniz et al. | |
| 2018/0223732 A1 | 8/2018 | Clements et al. | |
| 2019/0093489 A1* | 3/2019 | Mondal | F01D 5/3053 |
| 2021/0047933 A1* | 2/2021 | Usseglio | F01D 5/30 |

\* cited by examiner

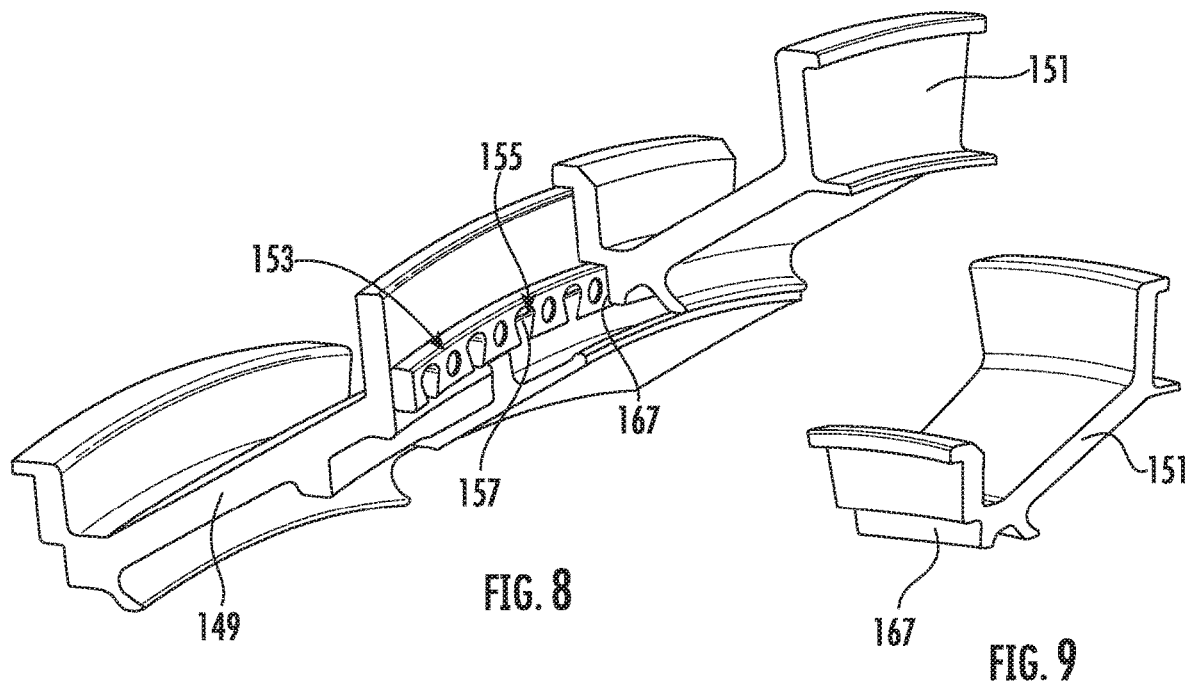

BLADE RETENTION FEATURES FOR TURBOMACHINES

GOVERNMENT SPONSORED RESEARCH

The project leading to this application has received funding from the Clean Sky 2 Joint Undertaking under the European Union's Horizon 2020 research and innovation program under grant agreement No. CS2-FRC-GAM 2018/2019-807090.

FIELD

The present disclosure relates generally to turbomachines, and more particularly, to blade retention features for turbomachines, such as gas turbine engines.

BACKGROUND

Gas turbine engines generally include a turbine section downstream of a combustion section that is rotatable with a compressor section to rotate and operate the gas turbine engine to generate power, such as propulsive thrust. General gas turbine engine design criteria often include conflicting criteria that must be balanced or compromised, including increasing fuel efficiency, operational efficiency, and/or power output while maintaining or reducing weight, part count, and/or packaging (i.e. axial and/or radial dimensions of the engine).

Gas turbine engines generally include a plurality of rotating rotor blades in at least one of a compressor of the compressor section or a turbine of the turbine section. Moreover, at least certain gas turbine engines also include a plurality of counter-rotating rotor blades in at least one of the compressor of the compressor section or the turbine of the turbine section. Common rotating blades are assembled and retained internally by a disk, e.g. by means of the blade root, dovetail or fir tree shaped or with a third part as a rivet or a bolted joint. The disk is typically located internally respect to the blade row. Counter-rotating blades are similarly attached to a rotating part, but externally.

Notwithstanding the aforementioned, there is a continuing need for improved retention features for retaining such blades of turbomachines within their respective rotating part.

BRIEF DESCRIPTION

Aspects and advantages of the invention will be set forth in part in the following description, or may be obvious from the description, or may be learned through practice of the invention.

In one aspect, the present disclosure is directed to a turbomachine. The turbomachine includes a rotatable annular outer drum rotor connected to a first plurality of blades. The rotatable annular outer drum rotor is constructed of, at least, a first drum segment and a second drum segment. The turbomachine further includes a retaining ring arranged and secured between the first and second drum segments of the rotatable annular outer drum rotor for radially retaining each of the first plurality of blades via their respective blade root portions within the rotatable annular outer drum rotor.

In one embodiment, the first and second drum segments of the rotatable annular outer drum rotor may be arranged together so as to define a gap therebetween. In such embodiments, the gap may be sized such that the retaining ring fills the gap.

In another embodiment, the first and second drum segments of the rotatable annular outer drum rotor may be secured together via a bolted joint.

In an embodiment, one of the first or second drum segments of the rotatable annular outer drum rotor and the retaining ring may include corresponding mating features for radially retaining the retaining ring in place during assembly of the turbomachine and/or for providing torque transmission from the retaining ring to the rotatable annular outer drum rotor. For example, in one embodiment, the corresponding mating features may include a plurality of protrusions on the rotatable annular outer drum rotor and a plurality of holes within the retaining ring that are sized to receive the plurality of protrusions.

In an embodiment, the turbomachine may also include a contact zone between the first and second drum segments for further axially retaining the first and second drum segments in place.

In further embodiments, each of the blade root portions may include one or more structural radial retention features for further radially retaining each of the blade root portions within the retaining ring. For example, in one embodiment, the structural radial retention feature(s) may include at least one dovetail received within at least one dovetail opening within the retaining ring.

In another embodiment, the structural radial retention feature(s) may include a plurality of dovetails received within a plurality of dovetail openings within the retaining ring. In such embodiments, the plurality of dovetail openings may be alternated with the plurality of holes within the retaining ring, e.g. circumferentially around the retaining ring.

In an embodiment, the retaining ring may be constructed of a plurality of ring segments.

In still another embodiment, the turbomachine may include a turbine section, a compressor section, or a generator. For example, in one embodiment, the turbine section may include a high pressure rotor having a high pressure turbine and a low pressure turbine having counter rotatable low pressure inner and outer rotors located aft of the high pressure rotor. The low pressure turbine may also include the rotatable annular outer drum rotor connected to the first plurality of blades and a rotatable annular inner drum rotor connected to a second plurality of blades.

In another aspect, the present disclosure is directed to a method of assembling a plurality of blades within a rotatable annular outer drum rotor of a turbomachine. The method includes providing a first drum segment of the rotatable annular outer drum rotor. Further, the method includes securing a retaining ring to the first drum segment. Moreover, the method includes securing a plurality of blade root portions of the plurality of blades within the retaining ring. In addition, the method may include securing a second drum segment of the rotatable annular outer drum rotor to the first drum segment such that the retaining ring is arranged therebetween. It should be appreciated that the method may further include any of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8 illustrates still another exploded, perspective view of the embodiment of FIG. 5, particularly illustrating first and second drum segments of the rotatable annular outer drum rotor with a retaining ring secured to one of the drum segments according to the present disclosure;

FIG. 9 illustrates a perspective view of the second drum segment of FIG. 8 according to the present disclosure.

Figure 1:
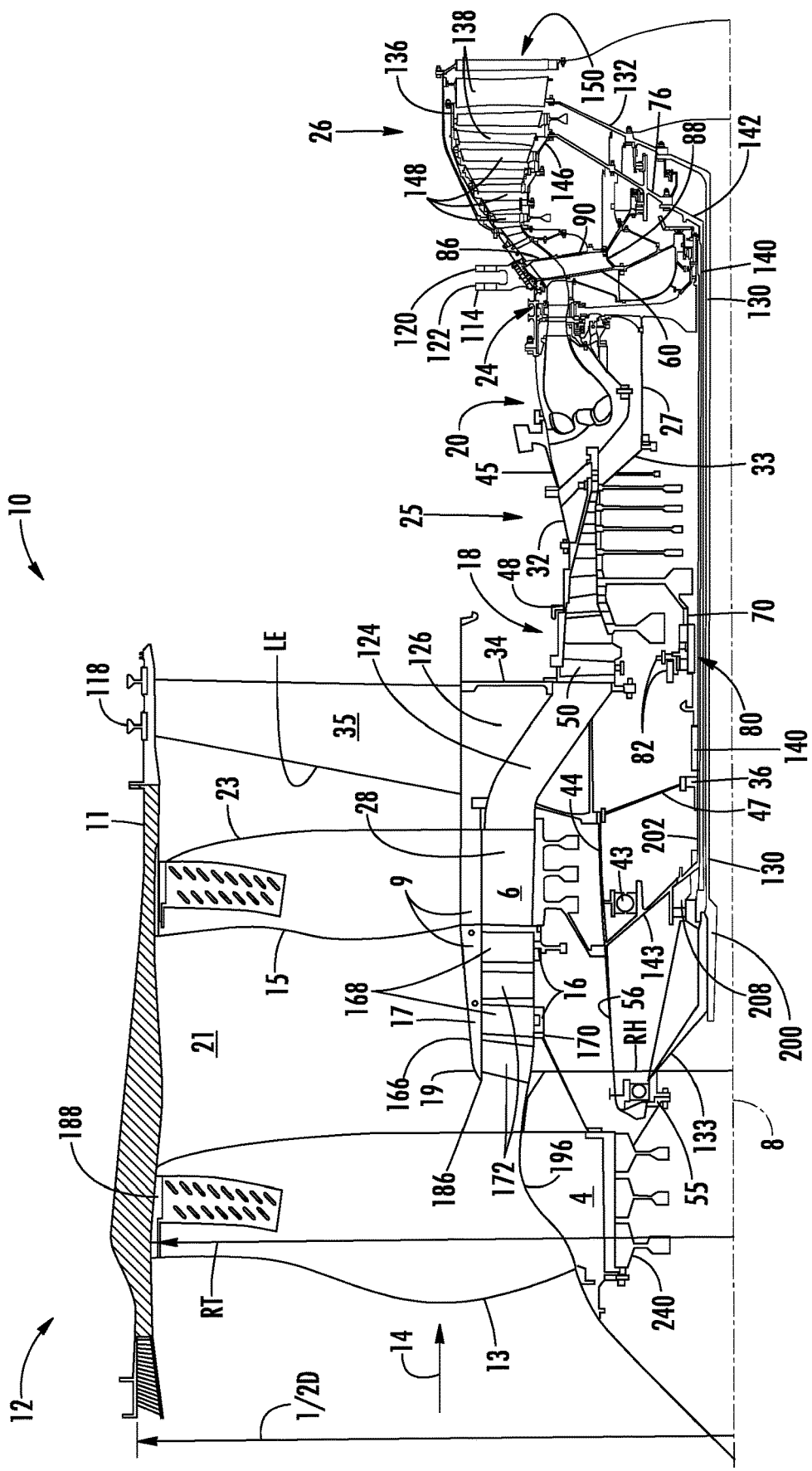
FIG. 1 illustrates a longitudinal sectional view of one embodiment of an aircraft turbofan gas turbine engine with a counter rotating low pressure turbine supported by an inter-turbine frame axially located between the low pressure turbine and a high pressure turbine.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first", "second", and "third" may be used interchangeably to distinguish one component or feature from another and are not intended to signify location, importance, or magnitude of the individual components or features.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows. The terms "coupled," "fixed," "attached to," and the like refer to direct coupling, fixing, or attaching, as well as indirect coupling, fixing, or attaching through one or more intermediate components or features, unless otherwise specified herein. The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic view of one embodiment of a turbomachine, such as a turbofan gas turbine engine 10 according to the present disclosure. As shown, the gas turbine engine 10 is circumscribed about an engine centerline 8 and includes a fan section 12 which receives inlet airflow of ambient air 14. The fan section 12 has counter rotating first and second fans 4 and 6 including first and second fan blade rows 13 and 15 and counter rotating first and second boosters 16 and 17, respectively. The counter rotating first and second boosters 16 and 17 are axially located between the counter rotating first and second fan blade rows 13 and 15, an arrangement which provides reduced noise emanating from the fan section 12. Following the fan section 12 is a high pressure compressor (HPC) 18, a combustor 20 which mixes fuel with the air 14 pressurized by the HPC 18 for generating combustion gases which flow downstream through a high pressure turbine (HPT) 24, and a counter rotating low pressure turbine (LPT) 26 from which the combustion gases are discharged from the engine 10. The engine 10 is designed such that the last stage of the second booster 17 and, in the exemplary embodiment, the second fan blade row 15 are counter rotatable with respect to the high pressure compressor 18. This reduces the sensitivity of the engine 10 to airflow inlet distortion of the fan section 12. It also reduces mutual sensitivity to rotating stall cells in the other rotors.

A high pressure shaft 27 joins the HPT 24 to the HPC 18 to substantially form a first or high pressure rotor 33. The high pressure compressor 18, the combustor 20, and the high pressure turbine 24 collectively are referred to as a core engine 25 which includes, for the purposes of this patent, the high pressure shaft 27. The core engine 25 is modular such that as a single unit it can be independently replaced separate from the other parts of the gas turbine.

A bypass duct 21 radially, bounded by a fan casing 11 and a rotatable annular radially inner bypass duct wall 9, surrounds the counter rotating first and second boosters 16 and 17 and an inlet duct 19 to the high pressure compressor 18 of the core engine 25. The bypass duct 21 is radially bounded by a fan casing 11 and an annular radially inner bypass duct wall 9. The radially inner bypass duct wall 9 includes a rotatable wall section 22 fixedly mounted to the second fan blade row 15 and from which the second booster 17 depends radially inwardly. A radially outer portion 23 of the second fan blade row is radially disposed within the bypass duct 21.

Figure 2:
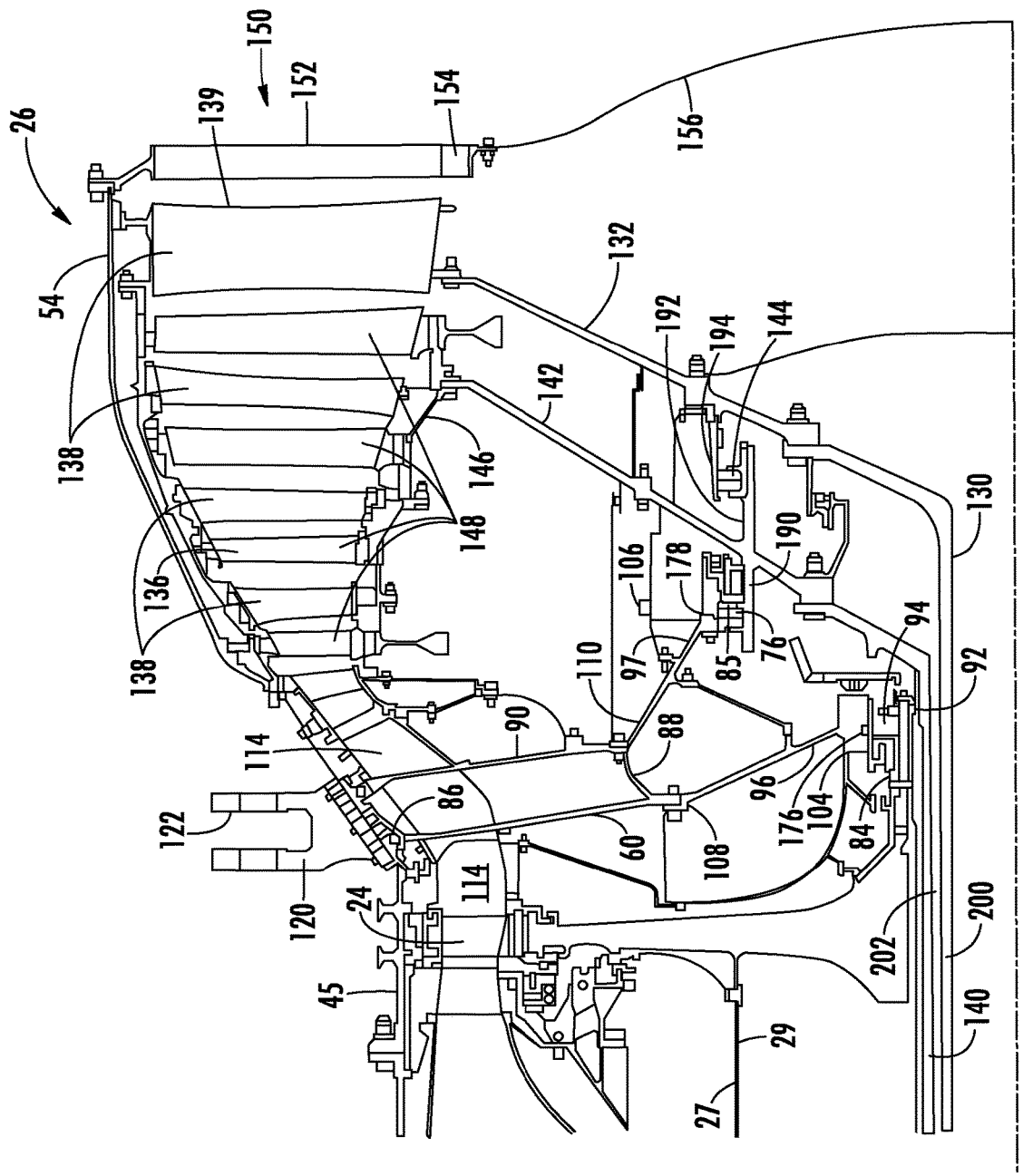
FIG. 2 illustrates an enlarged view illustration of the inter-turbine frame and counter rotating low pressure turbine rotors of the engine in FIG. 1.

Referring to FIGS. 1 and 2, the counter rotating low pressure turbine 26 includes an annular outer drum rotor 136 rotatably mounted to a low pressure inner shaft 130 by an aft low pressure inner conical shaft extension 132. The outer drum rotor 136 includes a plurality of low pressure turbine blade rows 138 extending radially inwardly therefrom and axially spaced from each other. The drum rotor 136 is cantilevered off of a final stage 139 of the low pressure turbine blade rows 138 which is bolted to the aft low pressure inner conical shaft extension 132. The counter rotating low pressure turbine 26 also includes an annular low pressure inner drum rotor 146 rotatably mounted to a low pressure outer shaft 140 by an aft low pressure outer conical shaft extension 142. The inner drum rotor 146 includes a plurality of second low pressure turbine blade rows 148 extending radially outwardly therefrom and axially spaced from each other. The first low pressure turbine blade rows 138 are interdigitated with the second low pressure turbine blade rows 148.

The low pressure outer shaft 140 drivingly connects the inner drum rotor 146 to the second fan blade row 15 and the second booster 17. The second fan blade row 15 is connected to the low pressure outer shaft 140 by a forward conical outer shaft extension 143. The low pressure outer shaft 140, the inner drum rotor 146, the second fan blade row 15, and the second booster 17 are major components of a low pressure outer rotor 202. The low pressure inner shaft 130 drivingly connects the outer drum rotor 136 to the first fan blade row 13 and the first booster 16. The first fan blade row 13 is connected to the low pressure inner shaft 130 by a forward conical inner shaft extension 133. The low pressure inner shaft 130, the outer drum rotor 136, the first fan blade row 13, and the first booster 16 are major components of a low pressure inner rotor 200.

The first booster 16 includes an annular first booster rotor section 166 including the rotatable wall section 22 from which axially spaced apart first booster blade rows 168 extend radially inwardly. The annular first booster rotor section 166 is illustrated as being integrally bladed in a manner similar to an integrally bladed disk, commonly referred to as a Blisk, or an integrally bladed rotor which has been used in conventional rotors because they are lightweight and allow no blade attachment leakage. The operating low speeds of the boosters and the low weight integrally bladed disk design of the first booster rotor section 166 helps minimize stresses and deflections of the first booster rotor section 166.

The second booster 17 includes an annular second booster rotor section 170 from which axially spaced apart second booster blade rows 172 extend radially outwardly. A radially inner portion 28 of the second fan blade row 15 is radially disposed within the inlet duct 19 and rotates with the second booster 17 and therefore is considered part of the second booster 17 and a second booster blade row 172. The first and second booster blade rows 168 and 172 are interdigitated and are counter rotating. The first and second fan blade rows 13 and 15 are fixedly attached to the first and second booster rotor sections 166 and 170, respectively. The low pressure inner and outer shafts 130 and 140, respectively, are at least, in part, rotatably disposed co-axially with and radially inwardly of the high pressure rotor 33.

The gas turbine engine 10 also has frame structure 32 including a forward or fan frame 34 connected by an engine casing 45 to a mid-engine or inter-turbine frame 60. The second fan blade row is axially located close to struts 35 of the fan frame 34 and so the leading edges of struts 35 are swept or leaned axially aftwardly to reduce noise. The engine 10 is mounted within or to an aircraft such as by a pylon (not illustrated) which extends downwardly from an aircraft wing. The inter-turbine frame 60 includes a first structural ring 86, which may be a casing, disposed co-axially about the centerline 8. The inter-turbine frame 60 further includes a second structural ring 88 disposed co-axially with and radially spaced inwardly of the first structural ring 86 about the centerline 8. The second structural ring 88 may also be referred to as a hub. A plurality of circumferentially spaced apart struts 90 extend radially between the first and second rings 86 and 88 and are fixedly joined thereto. The struts 90 are hollow in the exemplary embodiment of the invention illustrated herein but, in other embodiments, the struts may not be hollow. Because the inter-turbine frame 60 is axially located between the HPT 24 and the LPT 26 of the high pressure rotor 33 and the low pressure inner and outer rotors 200 and 202, it is referred to as an inter-turbine frame also sometimes referred to as a mid-engine frame. An inter-turbine transition duct 114 between the HPT 24 and the LPT 26 passes through the inter-turbine frame 60.

The engine is mounted to the aircraft at a forwardly located fan frame forward mount 118 on the fan frame 34 and at an aftwardly located turbine frame aft mount 120 on the inter-turbine frame 60. The engine 10 may be mounted below an aircraft wing by a pylon at the forward mount 118 and the aft mount 120 spaced axially downstream from the forward mount 118. The aft mount 120 is used to fixedly join the inter-turbine frame 60 to a platform which is fixedly joined to the pylon. In one embodiment, the aft mount 120 includes a U-shaped clevis 122. Conventional mounts often use a set of circumferentially spaced apart U-shaped clevises 122 (only one of the U-shaped clevises is shown in the cross-sectional illustrations in the figures) on the inter-turbine frame 60. The U-shaped clevises 122 are designed to be connected by a set of pins to a set of links. The links are connected to a platform on the bottom of the pylon. The U-shaped clevises 122 are one type of frame connecting means for connecting the engine to an aircraft. Other types of mounting means besides clevises are known in the aircraft industry and can be utilized to mount the frame of the present invention and the engine to the aircraft.

Figure 3:
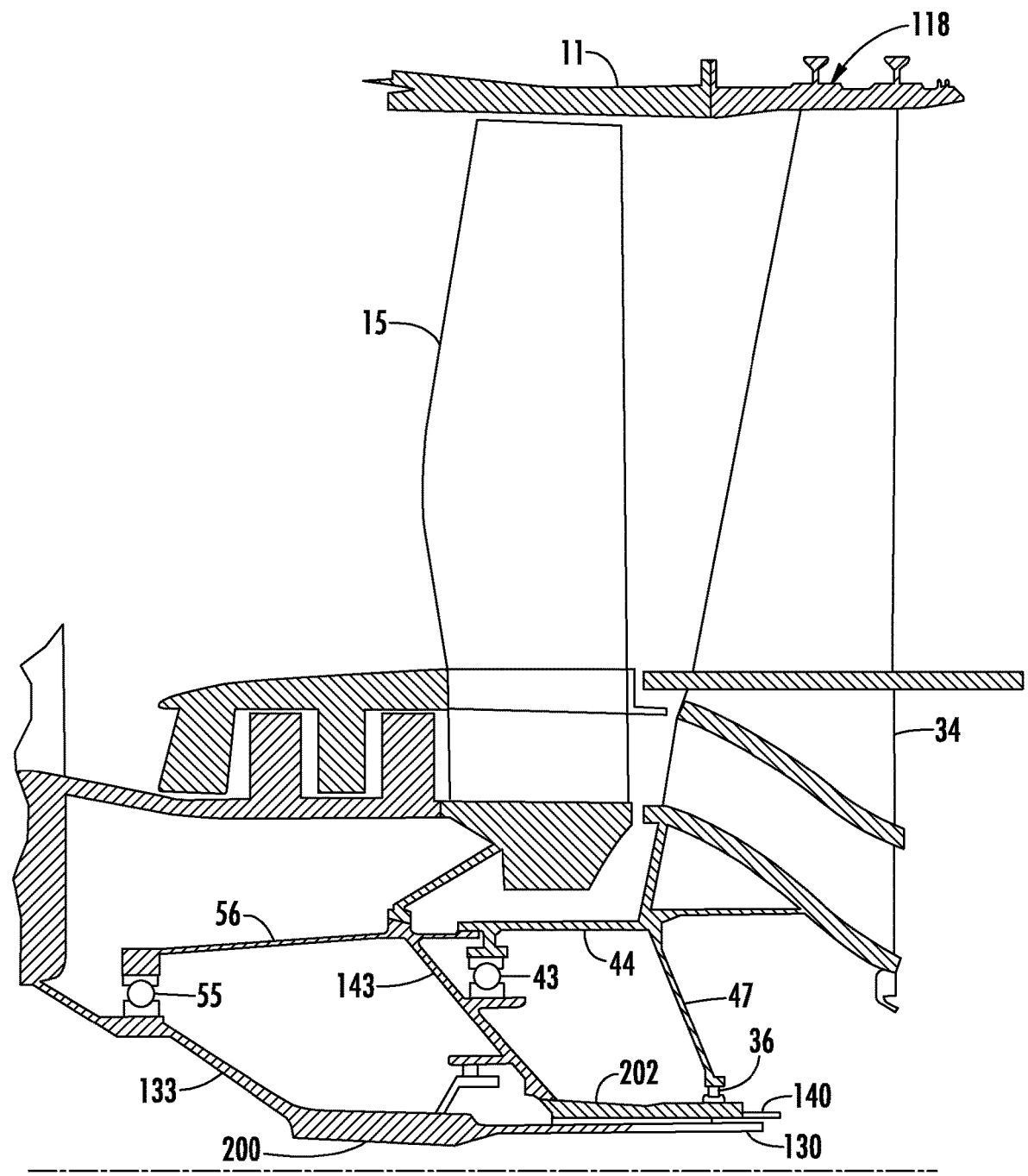
FIG. 3 illustrates an enlarged view illustration of a fan frame and forward bearings and sump of the engine in FIG. 1.

Referring more particularly to FIG. 3, the low pressure outer rotor 202, by way of the forward conical outer shaft extension 143, is rotatably supported axially and radially from the fan frame 34 by an aft thrust bearing 43 mounted in a first bearing support structure 44 and a second bearing 36, a roller bearing, mounted in a second bearing support structure 47. The low pressure inner rotor 200, by way of the forward conical inner shaft extension 133, is rotatably supported axially and radially from the fan frame 34 by a forward differential thrust bearing 55 which is mounted between a forwardly extending extension 56 of the forward conical outer shaft extension 143 and the forward conical inner shaft extension 133. The low pressure inner rotor 200 is further rotatably supported radially from the fan frame 34 by a forward differential bearing 208, a roller bearing, between the low pressure inner shaft 130 and the low pressure outer shaft 140. The first and second bearing support structures 44 and 47 are fixedly attached to the fan frame 34.

Referring more particularly to FIG. 2, the low pressure outer rotor 202, by way of the aft low pressure outer conical shaft extension 142 connected to the low pressure outer shaft 140, is rotatably supported radially by a third bearing 76 within the inter-turbine frame 60. The third bearing 76 is disposed between an aft bearing support structure 97 attached to an aft portion 110 of the inter-turbine frame 60 and a forward inner extension 190 of the aft low pressure outer conical shaft extension 142. The low pressure outer rotor 202 is most aftwardly rotatably supported by the third bearing 76 which is thus referred to as an aftwardmost low pressure rotor support bearing. The inter-turbine frame 60 of the present invention is axially located between the HPT 24 and the LPT 26 and thus substantially supports the entire low pressure turbine 26.

The low pressure inner rotor 200, by way of the aft low pressure inner conical shaft extension 132 connected to the low pressure inner shaft 130, is rotatably supported radially by the aft low pressure outer conical shaft extension 142 of the low pressure outer rotor 202. A differential bearing 144 (also referred to as an inter-shaft bearing) is disposed between an aft inner extension 192 of the aft low pressure outer conical shaft extension 142 and an outer extension 194 of the aft low pressure inner conical shaft extension 132. This allows the low pressure inner and outer rotors 200 and 202 to counter rotate.

Referring back to FIG. 1, a forward high pressure end 70 of the high pressure compressor 18 of the high pressure rotor 33 is radially rotatably supported by a bearing assembly 80 mounted in a bearing assembly support structure 82 attached to the fan frame 34. Referring more particularly to FIG. 2, an aft end 92 of the high pressure rotor 33 is aftwardly radially rotatably supported by a fifth bearing 94 mounted in a forward bearing support structure 96 attached to a forward portion 108 of the inter-turbine frame 60. The forward and aft bearing support structures 96 and 97 which are fixedly joined or attached to the forward and aft portions 108 and 110, respectively, of the inter-turbine frame 60 and thus are spaced axially apart. The forward and aft portions 108 and 110, respectively, of the inter-turbine frame 60 are separated by the second structural ring 88.

Forward and aft sump members 104 and 106 are joined to the inter-turbine frame 60 and carried by forward and aft bearing support structures 96 and 97. The forward and aft sump members 104 and 106 support the fifth bearing 94 and the third bearing 76 in forward and aft cylindrical central bores 84 and 85, respectively, of the sump members. The fifth bearing 94 and the third bearing 76 have forward and aft fixed outer races 176 and 178 that are fixedly connected to the forward and aft bearing support structures 96 and 97, respectively.

Located aft of the LPT 26 is an outlet guide vane assembly 150 which supports a stationary row of outlet guide vanes 152 that extend radially inwardly between a low pressure turbine casing 54 and an annular box structure 154. The outlet guide vane assembly 150 deswirls gas flow exiting the LPT 26. The low pressure turbine casing 54 connected is bolted to the engine casing 45 at the end of the inter-turbine transition duct 114 between the HPT 24 and the LPT 26. A dome-shaped cover plate 156 is bolted to the annular box structure 154. The outlet guide vane assembly 150 is not referred to and does not function as a frame because it does not rotatably support any of the engine's rotors.

The high pressure compressor 18 of turbofan gas turbine engine 10 of the present invention is operable and designed to operate with a relatively high compressor pressure ratio in a range of about 15 to about 30 and an overall pressure ratio in a range of about 40 to about 65. The compressor pressure ratio is a measure in the rise of pressure across just the high pressure compressor 18. The overall pressure ratio is a measure in the rise of pressure across the fan all the way through the high pressure compressor 18, i.e., it is a ratio of pressure exiting the high pressure compressor divided by pressure of ambient air 14 entering the fan section 12. The high pressure compressor 18 is illustrated having six high pressure stages 48 and three variable vane stages 50 for the first four of the high pressure stages 48. Less than four variable vane stages 50 may be used. The high pressure compressor 18 has a relatively small number of the high pressure stages 48 and the invention contemplates using between 6 and 8 of the high pressure stages and about four of the variable vane stages 50 or less. This makes for a short engine while still having a high overall pressure ratio in a range of 40-65.

The engine has a design bypass ratio in a range of 5-15 and a design fan pressure ratio in a range of 1.4-2.5. The counter rotating first and second fan blade rows 13 and 15 are designed to operate with tip speeds that, for the two blade rows, sum to a range of about 1000 to 2500 feet/sec which allows the use of light weight composite fan blades. Light weight, uncooled, high temperature capability, counter rotating ceramic matrix composite (CMC) airfoils may be used in the counter rotating low pressure turbine 26. Thus, the engine 10 and the fan section 12 may be described as having a sum of operational fan tip speeds of the first and second fan blade rows 13 and 15 in a range of 1000 to 2500 feet per second.

Referring still to FIG. 1, a tip radius RT is illustrated, as measured from the engine centerline 8 to a fan blade tip 188 of the first fan blade row 13 and a hub radius RH as measured from the engine centerline 8 to a rotor hub 196 of the low pressure inner rotor 200 at an entrance 186 to the inlet duct 19 to the high pressure compressor 18 of the core engine 25. The engine 10 of the present invention may be designed with a small fan inlet hub to tip radius ratio (RH/RT) in a range between 0.20 and 0.35. For a given set of fan inlet and inlet duct annulus areas a low fan inlet hub to tip radius ratio allows a smaller fan diameter when compared to a larger ratio. However, fan inlet hub to tip radius ratio levels are constrained by the ability to design a disk to support the rotating fan blades. The fan blades in the exemplary embodiment illustrated herein are made of lightweight composite materials or aluminum and rotor fan tip speeds are designed so that a fan disk 126 can be designed for the fan inlet hub to tip radius ratio to be as low as 0.20. The low fan inlet hub to tip radius ratio allows low slopes and short lengths of the core engine transition duct 124 between the fan section 12 and the high pressure compressor 18 and of the inter-turbine transition duct 114 between the HPT 24 and the LPT 26.

Referring now to FIGS. 4-8, various views of one of the first plurality of low pressure turbine blades 138 being secured to the annular outer drum rotor 136 according to the present disclosure are illustrated. As shown in the illustrated embodiment, the low pressure turbine blade 138 includes a blade root portion 141 for securing to the annular outer drum rotor 136. Though the embodiments of FIGS. 4-8 are illustrated as pertaining the low pressure turbine blades 138, it should be understood that the retention features described herein may be used with any rotatable annular outer drum rotor connected to any suitable one or more blades.

Figure 4:
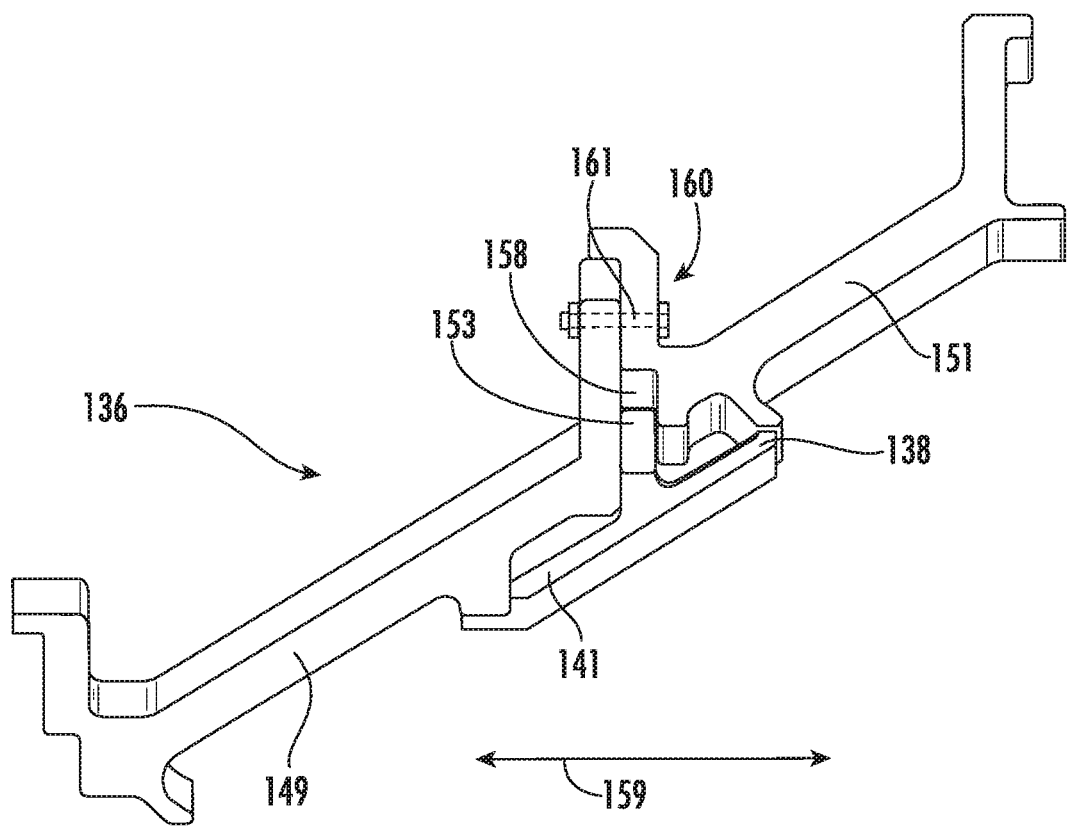
FIG. 4 illustrates a side view of one embodiment of a segmented rotatable annular outer drum rotor having a blade root portion of a blade secured therebetween via a retaining ring according to the present disclosure.
Figure 5:
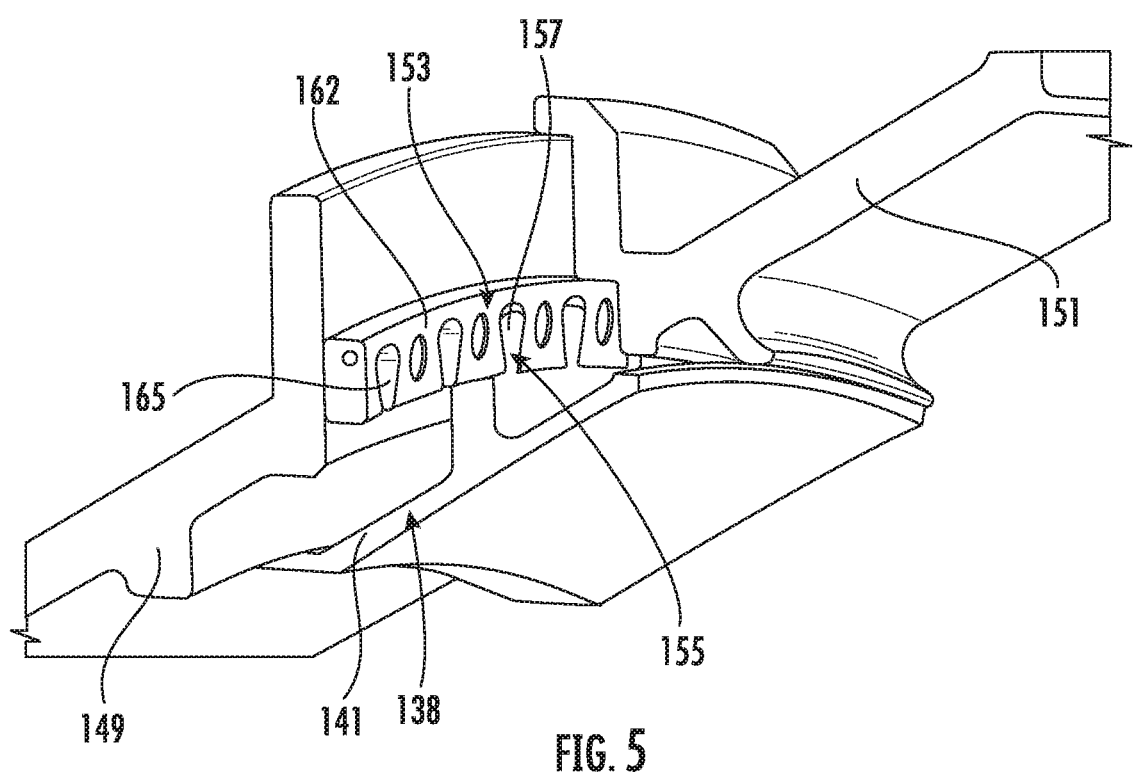
FIG. 5 illustrates a side, perspective view of one embodiment of a segmented rotatable annular outer drum rotor having a blade root portion of a blade secured therebetween via a retaining ring according to the present disclosure.

Referring particularly to FIGS. 4, 5, and 8, the rotatable annular outer drum rotor 136 may be segmented. For example, as shown, the rotatable annular outer drum rotor 136 may be constructed of a first drum segment 149 and a second drum segment 151. It should be understood that the rotatable annular outer drum rotor 136 may be further segmented into any number of suitable segments. Accordingly, in certain embodiments, as shown particularly in FIG. 4, the first and second drum segments 149, 151 of the rotatable annular outer drum rotor 136 may be secured together via a bolted joint 160. More specifically, as shown, the bolted joint 160 may include one or more fasteners 161 for securing the first and second drum segments 149, 151 of the rotatable annular outer drum rotor 136 together.

In further embodiments, as shown particularly in FIG. 4, the first and second drum segments 149, 151 of the rotatable annular outer drum rotor 136 may be arranged together so as to define a gap 158 therebetween. In such embodiments, the gap 158 may be sized such that the retaining ring 153 fills or closes the gap 158, e.g. in a longitudinal direction 159 of the gas turbine engine 10.

Referring generally to FIGS. 4-8, the rotatable annular outer drum rotor 136 may also include a retaining ring 153 arranged and secured between the first and second drum segments 149, 151 of the rotatable annular outer drum rotor 136 for radially retaining each of the first plurality of blades 138 via their respective blade root portions 141 within the rotatable annular outer drum rotor 136. In addition, in one embodiment, as shown generally in FIGS. 4-8, the retaining ring 153 may be constructed of a plurality of ring segments 162 (only one of which is shown). In alternative embodiments, the retaining ring 153 may be constructed of a single unitary ring component.

Figure 6:
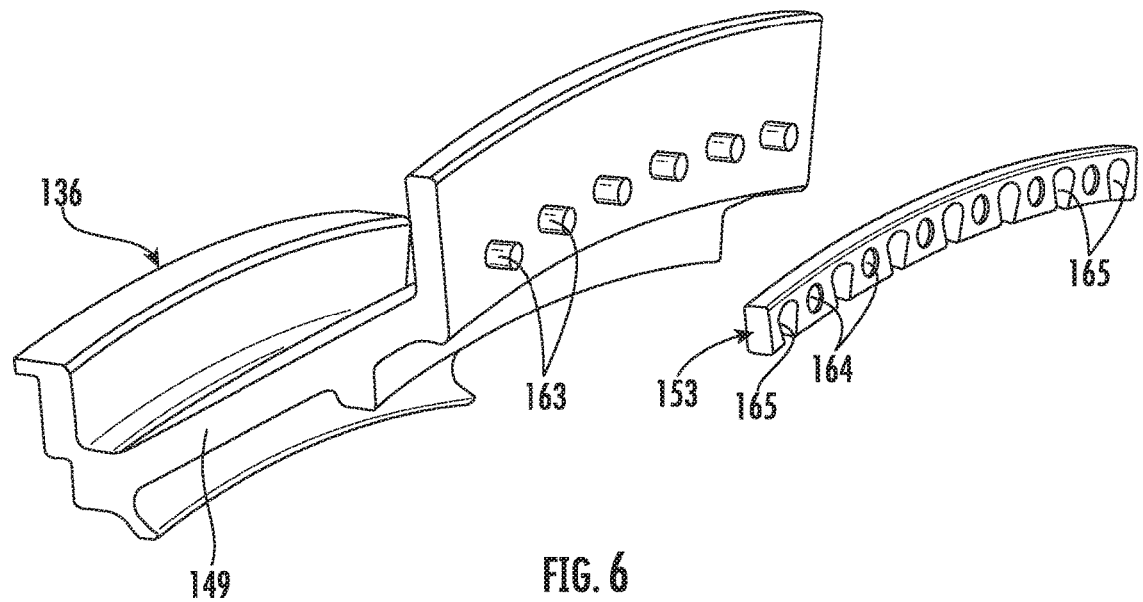
FIG. 6 illustrates an exploded, perspective view of the embodiment of FIG. 5, particularly illustrating one of the drum segments of the rotatable annular outer drum rotor and a retaining ring according to the present disclosure.
Figure 7:
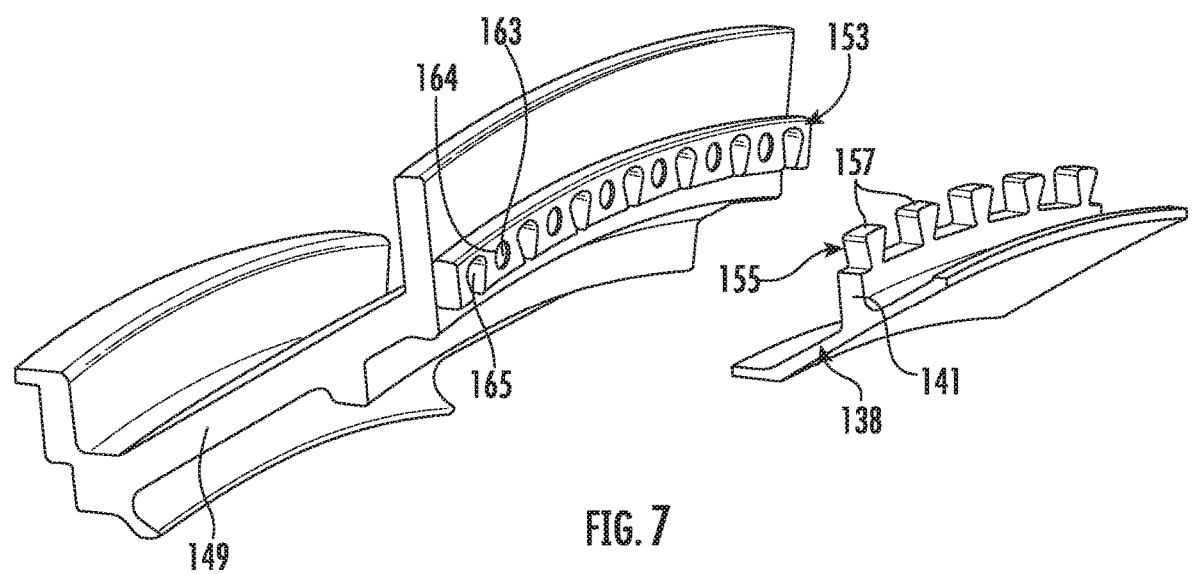
FIG. 7 illustrates another exploded, perspective view of the embodiment of FIG. 5, particularly illustrating one of the drum segments of the rotatable annular outer drum rotor with a retaining ring secured thereto and a blade root portion of a blade according to the present disclosure.

Referring particularly to FIGS. 5-7, the retaining ring 153 may include a plurality of dovetail openings 165 configured to receive corresponding features of the blade root portions 141 (e.g. one or more dovetails 157 as described herein). For example, as shown, each of the blade root portions 141 may include one or more structural radial retention features 155 for radially retaining each of the blade root portions 141 within the annular outer drum rotor 136 (e.g. to prevent the blades 138 from falling out of the outer drum rotor 136 during assembly and/or engine shut down).

More specifically, as shown, the structural radial retention feature(s) 155 may include at least one dovetail 157. For example, as shown, the structural radial retention feature(s) 155 may include a plurality of dovetails 157 received within the plurality of dovetail openings 165 within the retaining ring 153.

In particular embodiments, the dovetail(s) 157 may have any suitable cross-sectional shape, such as for example, a fir-tree-shaped cross-section. In addition, as shown, the dovetail(s) 157 is configured provide a path for torque transmission from the individual low pressure turbine blade 138 to the outer drum rotor 136 during operation of the gas turbine engine 10. Thus, the dovetails 157 of the blade root portions 141 can be received within the corresponding dovetail openings 165 such that the blade root portions 141 are radially retained within the rotatable annular outer drum rotor 136.

In addition, in an embodiment, one of the first or second drum segments 149, 151 of the rotatable annular outer drum rotor 136 and the retaining ring 153 may include corresponding mating features 163, 164 for radially retaining the retaining ring 153 in place during assembly of the gas turbine engine 10. Further, such mating features 163, 164 may also provide torque transmission from the retaining ring 153 to the rotatable annular outer drum rotor 136.

For example, in one embodiment, as particularly in FIGS. 6 and 7, the corresponding mating features 163, 164 may include a plurality of protrusions 163 on the rotatable annular outer drum rotor 136 and a plurality of holes 164 within the retaining ring 153. Thus, as shown, the individual holes 164 are sized to receive the protrusions 163. In one embodiment, as shown, the holes 164 may be through holes. In an alternative embodiment, the holes 164 may be recesses that do not extend through the retaining ring 153. In yet another embodiment, as shown in FIGS. 6 and 7, the plurality of dovetail openings 165 may be alternated with the plurality of holes 164 within the retaining ring 153, e.g. circumferentially around the retaining ring 153.

Referring particularly to FIGS. 8 and 9, in an embodiment, the gas turbine engine 10 may also include a contact zone or flange 167, e.g. on the first drum segment 149 for further axially retaining the first and second drum segments 149, 151 in place.

Figure 10:
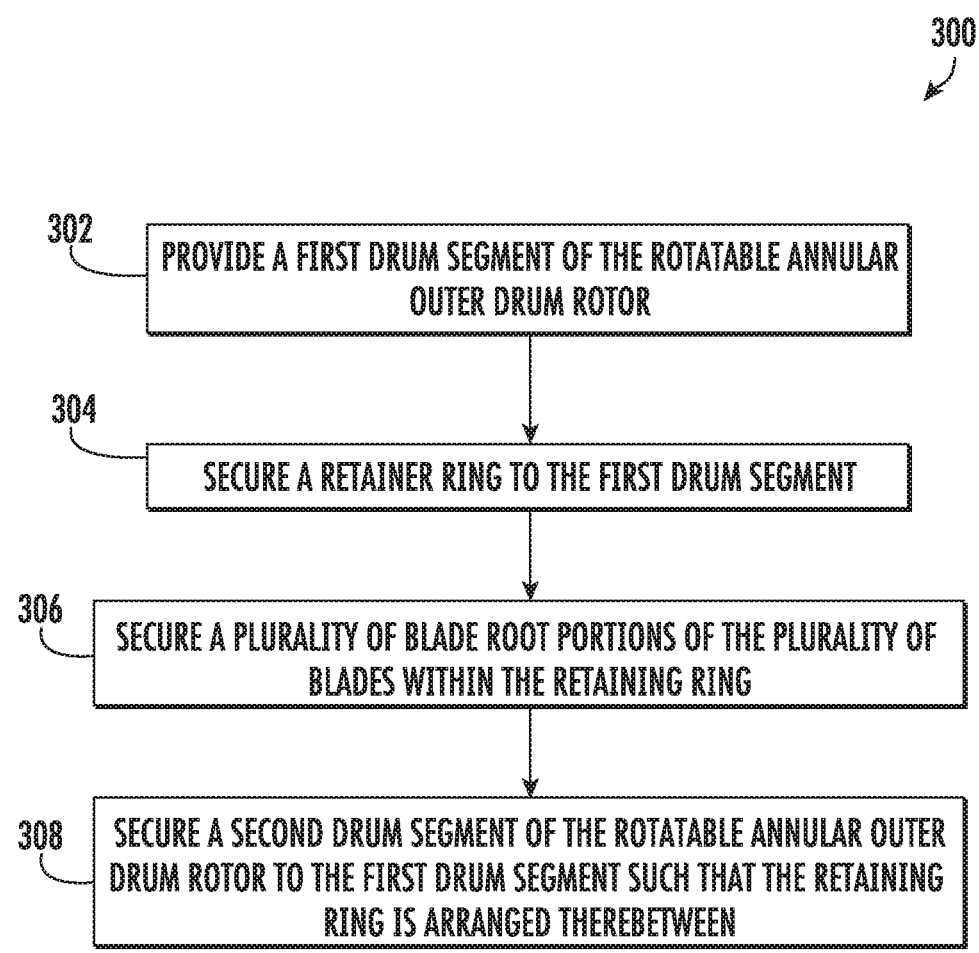
FIG. 10 illustrates a flow diagram of one embodiment of a method of assembling a plurality of blades within a rotatable annular outer drum rotor of a turbomachine according to the present disclosure.

Referring now to FIG. 10, a flow diagram of one embodiment of a method 300 of assembling a plurality of blades within a rotatable annular outer drum rotor of a turbomachine according to the present disclosure is illustrated. In general, the method 300 described herein generally applies to operating the gas turbine engine 10 described above. However, it should be appreciated that the disclosed method 300 may be implemented using any other suitable wind turbine. Further, FIG. 10 depicts steps performed in a particular order for purposes of illustration and discussion. Those of ordinary skill in the art, using the disclosures provided herein, will understand that various steps of any of the methods disclosed herein can be adapted, omitted, rearranged, or expanded in various ways without deviating from the scope of the present disclosure.

As shown at (302), the method 300 includes providing a first drum segment of the rotatable annular outer drum rotor. As shown at (304), the method 300 includes securing a retaining ring to the first drum segment. As shown at (306), the method 300 includes securing a plurality of blade root portions of the plurality of blades within the retaining ring. As shown at (308), the method 300 includes securing a second drum segment of the rotatable annular outer drum rotor to the first drum segment such that the retaining ring is arranged therebetween.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A turbomachine, comprising:
   a rotatable annular outer drum rotor connected to a first plurality of blades, the rotatable annular outer drum rotor being constructed of, at least, a first drum segment and a second drum segment; and
   a retaining ring arranged and secured between the first and second drum segments of the rotatable annular outer drum rotor for radially retaining each of the first plurality of blades via their respective blade root portions within the rotatable annular outer drum rotor;

wherein one of the first or second drum segments of the rotatable annular outer drum rotor and the retaining ring comprise corresponding mating features for radially retaining the retaining ring in place during assembly of the turbomachine and/or for providing torque transmission from the retaining ring to the rotatable annular outer drum rotor.

2. The turbomachine of claim 1, wherein the first and second drum segments of the rotatable annular outer drum rotor are arranged together so as to define a gap therebetween, the gap being sized such that the retaining ring fills the gap.

3. The turbomachine of claim 2, wherein the first and second drum segments of the rotatable annular outer drum rotor are secured together via a bolted joint.

4. The turbomachine of claim 1, wherein the corresponding mating features comprise a plurality of protrusions on the rotatable annular outer drum rotor and a plurality of holes within the retaining ring that are sized to receive the plurality of protrusions.

5. The turbomachine of claim 1, further comprising a contact zone between the first and second drum segments for further axially retaining the first and second drum segments in place.

6. The turbomachine of claim 4, wherein each of the blade root portions further comprises one or more structural radial retention features for further radially retaining each of the blade root portions within the retaining ring.

7. The turbomachine of claim 6, wherein the one or more structural radial retention features comprises at least one dovetail received within at least one dovetail opening within the retaining ring.

8. The turbomachine of claim 7, wherein the one or more structural radial retention features comprises a plurality of dovetails received within a plurality of dovetail openings within the retaining ring, the plurality of dovetail openings being alternated with the plurality of holes within the retaining ring.

9. The turbomachine of claim 1, wherein the retaining ring is constructed of a plurality of ring segments.

10. The turbomachine of claim 1, wherein the turbomachine comprises at least one of a turbine section, a compressor section, or a generator.

11. The turbomachine of claim 10, wherein the turbomachine comprises the turbine section, the turbine section comprising a high pressure rotor comprising a high pressure turbine and a low pressure turbine comprising counter rotatable low pressure inner and outer rotors located aft of the high pressure rotor, the low pressure turbine further comprising the rotatable annular outer drum rotor connected to the first plurality of blades and a rotatable annular inner drum rotor connected to a second plurality of blades.

12. A method of assembling a plurality of blades within a rotatable annular outer drum rotor of a turbomachine, the method comprising:

providing a first drum segment of the rotatable annular outer drum rotor;

securing a retaining ring to the first drum segment;

securing a plurality of blade root portions of the plurality of blades within the retaining ring;

securing a second drum segment of the rotatable annular outer drum rotor to the first drum segment such that the retaining ring is arranged therebetween; and securing the retaining ring to the first drum segment via corresponding mating features located on the first drum segment and the retaining ring, the corresponding mating features configured for radially retaining the retaining ring in place during assembly of the turbomachine and/or for providing torque transmission from the retaining ring to the rotatable annular outer drum rotor.

13. The method of claim 12, further comprising securing the second drum segment of the rotatable annular outer drum rotor to the first drum segment via a bolted joint.

14. The method of claim 12, wherein the corresponding mating features comprise a plurality of protrusions on the first drum segment of the rotatable annular outer drum rotor and a plurality of holes within the retaining ring that are sized to receive the plurality of protrusions.

15. The method of claim 14, further comprising a contact zone between the first and second drum segments for further axially retaining the first and second drum segments in place.

16. The method of claim 12, wherein each of the blade root portions further comprises one or more structural radial retention features for further radially retaining each of the blade root portions within the retaining ring.

17. The method of claim 16, wherein the one or more structural radial retention features comprises a plurality of dovetails received within a plurality of dovetail openings within the retaining ring, the plurality of dovetail openings being alternated with a plurality of holes within the retaining ring.

18. The method of claim 12, wherein securing the retaining ring to the first drum segment further comprises securing a plurality of ring segments to the first drum segment to form the retaining ring.

19. A turbomachine, comprising:

a rotatable annular outer drum rotor connected to a first plurality of blades, the rotatable annular outer drum rotor being constructed of, at least, a first drum segment and a second drum segment; and a retaining ring arranged and secured between the first and second drum segments of the rotatable annular outer drum rotor for radially retaining each of the first plurality of blades via their respective blade root portions within the rotatable annular outer drum rotor;

wherein at least a portion of the blade root portions further comprises one or more structural radial retention features for further radially retaining the blade root portions within the retaining ring.

20. The turbomachine of claim 19, wherein the first and second drum segments of the rotatable annular outer drum rotor are arranged together so as to define a gap therebetween, the gap being sized such that the retaining ring fills the gap.

* * * * *